United States Patent
Tremblais

(10) Patent No.: US 8,220,350 B2
(45) Date of Patent: Jul. 17, 2012

(54) GEARBOX FOR LIFT TRUCK WITH TELESCOPIC JIB, AND MACHINE EQUIPPED WITH SAME

(75) Inventor: Sébastien Tremblais, La Chapelle du Mont du Chat (FR)

(73) Assignee: Volvo Compact Equipment SAS, Belley (FR)

( * ) Notice: Subject to any disclaimer, the term of this patent is extended or adjusted under 35 U.S.C. 154(b) by 1037 days.

(21) Appl. No.: 11/814,559

(22) PCT Filed: Jan. 27, 2005

(86) PCT No.: PCT/FR2005/050050
§ 371 (c)(1),
(2), (4) Date: Apr. 18, 2008

(87) PCT Pub. No.: WO2006/079696
PCT Pub. Date: Aug. 3, 2006

(65) Prior Publication Data
US 2008/0250898 A1  Oct. 16, 2008

(51) Int. Cl.
*F16H 3/08* (2006.01)
(52) U.S. Cl. ............................ 74/330; 74/331
(58) Field of Classification Search ............... 74/325, 74/329–331, 339, 340, 11, 15.2, 15.6, 15.63, 74/15.84
See application file for complete search history.

(56) References Cited

U.S. PATENT DOCUMENTS

| | | | | |
|---|---|---|---|---|
| 3,266,599 A | * | 8/1966 | Dearden | 414/635 |
| 4,476,748 A | * | 10/1984 | Morscheck | 477/122 |
| 4,548,101 A | * | 10/1985 | Akashi et al. | 74/720 |
| 4,824,128 A | * | 4/1989 | Takagi et al. | 180/53.1 |
| 5,001,941 A | * | 3/1991 | Nemoto | 74/15.63 |
| 5,481,932 A | * | 1/1996 | Downs et al. | 74/331 |
| 5,542,808 A | * | 8/1996 | Chiron et al. | 414/498 |
| 5,823,051 A | * | 10/1998 | Hall, III | 74/325 |
| 6,045,485 A | * | 4/2000 | Klinger et al. | 477/203 |

(Continued)

FOREIGN PATENT DOCUMENTS
FR  2603234 A  3/1988

OTHER PUBLICATIONS

International Search Report for International Patent Application PCT/FR2005/050050, dated Sep. 6, 2005.

(Continued)

*Primary Examiner* — Justin Holmes
*Assistant Examiner* — Huan Le
(74) *Attorney, Agent, or Firm* — Novak Druce + Quigg LLP

(57) ABSTRACT

The invention concerns a gearbox (21) for a lift truck with telescopic jib. Such a gearbox comprises a torque converter (30) in input, and an output shift (45), characterized in that it comprises: an input shaft, called primary shaft, connected to the torque converter (30) and whereon is arranged a clutch mechanism (32); a secondary shaft (35) driven in rotation by the clutch mechanism (32); two pinions, namely first (37) and second (38) pinions, mounted freely rotatable on the secondary shaft (5) and capable of being driven alternately therewith depending on the movement of a synchronizing device; a tertiary shaft (40) coupled with the secondary shaft (45) through the first pinion (37) and a reversing pinion (42) driven by the second pinion (38), the tertiary shaft (40) comprising a plurality of pinions (39, 41, 46, 47) for coupling with the output shaft (45), in accordance with the desired transmission ratio.

7 Claims, 3 Drawing Sheets

U.S. PATENT DOCUMENTS

2001/0014277 A1    8/2001    Braud
2002/0033071 A1*   3/2002    Kobayashi ................... 74/730.1
2002/0042852 A1    4/2002    Umemoto et al.
2004/0138800 A1    7/2004    Brandt et al.
2005/0252325 A1*  11/2005   Stevenson ....................... 74/325

OTHER PUBLICATIONS

International Preliminary Report on Patentability for International Patent Application PCT/FR2005/050050, dated May 2, 2007.

* cited by examiner

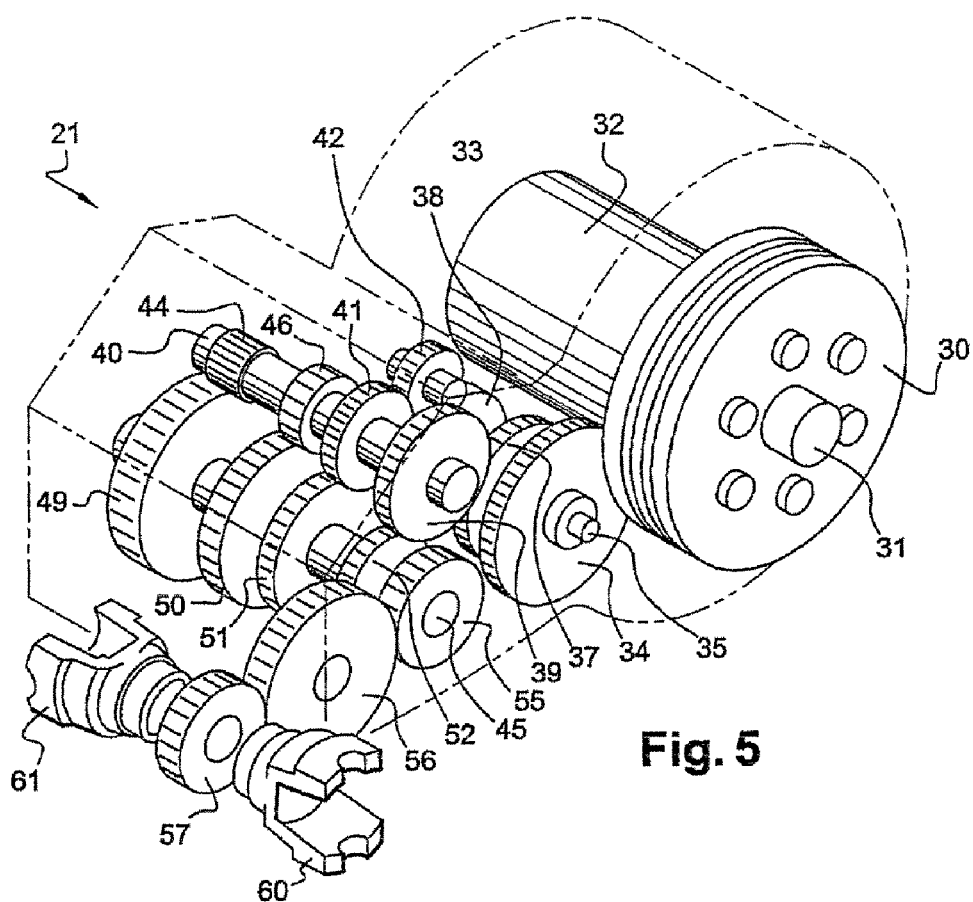
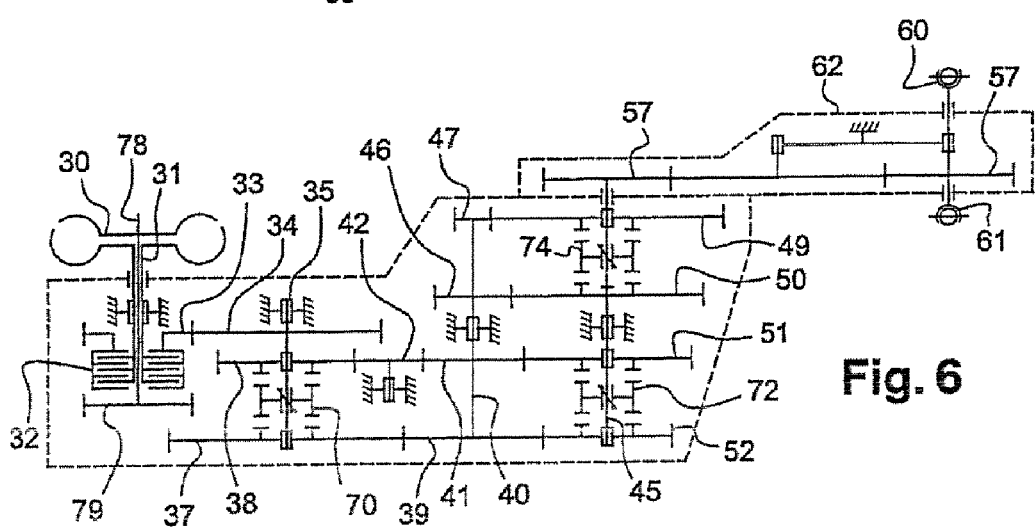

GEARBOX FOR LIFT TRUCK WITH TELESCOPIC JIB, AND MACHINE EQUIPPED WITH SAME

TECHNICAL FIELD

The invention relates to the field of industrial vehicles, of the type consisting of a lift truck with a telescopic jib. It is directed more particularly toward a configuration of the gearbox equipping such machines, with the aim of reducing its size, resulting in favorable consequences for the overall structure of the machine.

PRIOR ART

Generally, lift trucks with a telescopic jib comprise two axles supporting a chassis itself supporting the combustion engine, the transmission mechanism, the telescopic jib which extends longitudinally, and the driver's cab.

Maneuverability and ergonomic constraints impose the dimensioning and positioning of the various components making up the machine.

Hence, what is sought for a lift truck is optimized maneuverability, this being manifested by the reduction in the distance between the front and rear axles. Thus, it is assumed that a machine should have a wheelbase between the front and rear axles which is less than 2.60 meters so that it can move around within any type of work site, with a capability of performing maneuvers in narrow work areas.

Reducing the distances between the front and rear axles limits the available volume in the bottom section of the chassis that is occupied by the combustion engine, the gearbox providing transmission to the axles, and the hydraulic circuit for maneuvering the telescopic jib, and also the associated cooling circuit.

The volume occupied by these various components must not extend excessively upward into the space occupied by the telescopic jib. Indeed, for reasons of stability, the telescopic jib is generally installed in the central section of the machine, and extends longitudinally. The driver's cab is situated on one side of this telescopic jib, and it is important for safety reasons that the driver has the clearest possible field of view over the entire area surrounding the vehicle.

Specifically, it is important that he can have a permanent view of the load, irrespective of the movement of the jib. When the vehicle is moving, the driver must also have good visibility of the rear section of the vehicle, beyond the pivot point of the jib with respect to the chassis, and it is also very important for the driver to have lateral visibility on the opposite side of the jib with respect to the location of the cab.

Consequently, it is important for the jib not to be situated at too great a height with respect to the chassis, at the risk of impeding the driver's lateral visibility. It will also be appreciated that this type of vehicle is intended to move around on uneven ground and that a minimum ground clearance, of around 400 millimeters, is necessary.

Various solutions have already been proposed in respect of arranging the combustion engine, the gearbox and the associated cooling system. Indeed, the combustion engine occupies a considerable volume insofar as it is intended to develop a power of around 100 hp or above.

Among the known existing solutions is that described in U.S. Pat. No. 6,668,964 which consists in mounting the combustion engine transversely. In this way, the engine extends mainly in a transverse direction and occupies only a limited volume in the longitudinal direction. An angle transmission system makes it possible to transmit the torque developed by the engine to a central gearbox, itself connected to the front and rear axles by two Cardan shafts. The gearbox equipping this type of machine is of the traditional type and hence comprises two clutch devices on the gearbox input shaft that are actuated alternately depending on whether the machine is to move in forward gear or in reverse gear. It will be appreciated that the use of two separate clutch mechanisms on the same input shaft increases the overall volume of the gearbox.

Other solutions have been proposed in which the combustion engine is not installed transversely, but instead longitudinally. In that case, the gearbox is situated in the continuation of the combustion engine, on the output side thereof.

The solutions in which the combustion engine, the gearbox and the drive for the hydraulic pumps are arranged in the same alignment are incompatible with the reduced wheelbase specified above in the case of specified power levels of around 100 hp or more.

Another solution consists in replacing the gearbox with a hydraulic pump which is itself connected hydraulically to a hydraulic motor. This motor transmits the mechanical torque to the axle assemblies via a "hydrostatic" transmission. The cost of a hydrostatic transmission is a disadvantage against this type of solution.

SUMMARY OF THE INVENTION

One of the objectives of the invention is therefore to provide a new gearbox structure which allows the use of a longitudinal engine without overly increasing the length of the assembly consisting of combustion engine, gearbox and drive for the hydraulic pumps so as to maintain a limited wheelbase level, typically less than 2.60 m, between the front and rear axles.

Another objective of the invention is to limit the volume of this assembly such that it is possible to arrange the telescopic jib at a limited height that does not impede visibility, in particular lateral visibility.

Another objective of the invention is to avoid the use of a hydrostatic power transmission and to retain a mechanical transmission, which is more economic with equivalent performance levels.

The invention therefore relates to a gearbox for a lift truck with a telescopic jib, which comprises a torque converter on its input side, and an output shaft.

According to the invention, this gearbox is characterized in that it comprises:
 a gearbox input shaft, termed primary shaft, connected to the torque converter and on which a clutch mechanism is positioned;
 a secondary shaft rotationally driven by the clutch mechanism;
 two pinions, namely a first pinion and a second pinion, mounted to freewheel on the secondary shaft and able to be driven in turn with this shaft according to the movement of a synchronizer device;
 a tertiary shaft coupled with the secondary shaft by the first pinion and a reversing pinion driven by the second pinion, the tertiary shaft comprising a plurality of pinions for coupling with the output shaft according to the desired transmission ratio.

In other words, the gearbox according to the invention comprises only a single clutch mechanism unlike existing gearboxes which comprise two clutch mechanisms, namely a first mechanism for transmission in forward gear and a second mechanism for transmission in reverse gear.

According to the invention, selection between reverse gear and forward gear occurs downstream of the single clutch mechanism by virtue of the transmission of the torque being selected by one of the two pinions arranged on the secondary shaft driven by the clutch mechanism. The presence of a single clutch mechanism considerably reduces the overall size of the gearbox, and thus makes it possible for this gearbox to be installed on the longitudinal output side of the engine while thus freeing up a volume which can be used by other components of the vehicle, without the need to increase either the wheelbase or the height of the telescopic jib.

Hence, the synchronizer device makes it possible, based on the direction of travel control, to drive the first or second pinion with the secondary shaft. Depending on whether it is the first or second pinion that is driven by the secondary shaft, the tertiary shaft turns in one direction or in the other. Specifically, the tertiary shaft is driven directly in forward gear using the first pinion, while in reverse gear the second pinion drives a reversing pinion, itself engaging the tertiary shaft.

The control of the movement of the synchronizer devices situated on the secondary shaft can be co-ordinated with the control of the clutch mechanism, thus making it possible to stop the transmission of the engine torque when changing direction and to do so for the duration required to synchronize and mechanically couple the secondary shaft and the tertiary shaft.

In practice, the synchronizer devices situated on the secondary shaft can preferably be controlled in an electrohydraulic manner so as to tie the electrical control of the clutch mechanism with the mechanism for changing direction of rotation.

According to another feature of the invention, the output shaft of the gearbox can be connected to a transfer box intended to be connected to at least one of the transmission shafts of the vehicle. This transfer box makes it possible to offset transversely the output side of the transmission ratio selection system so as to align it as far as possible with the longitudinal axis of the machine. In this way it is possible to limit the angles imposed on the Cardan joints which connect the transmission shafts with the output side of the transfer box.

According to another feature of the invention, the torque converter can advantageously have a hollow shaft which is traversed by a drive shaft of a power take-off. This power take-off can advantageously be connected to a hydraulic pump, and in particular the pump for pressurizing the main hydraulic circuit of the vehicle responsible for maneuvering the telescopic jib.

BRIEF DESCRIPTION OF THE FIGURES

The manner of implementing the invention, together with the advantages resulting therefrom, will become clearly apparent from the description of the embodiment which follows, supported by the appended figures, in which:

FIG. 5 is a schematic perspective view of the gearbox equipping the machine shown in FIG. 1;

FIG. 6 is a diagram of the kinematic system of the gearbox shown in FIG. 3.

MANNER OF IMPLEMENTING THE INVENTION

Figure 1:
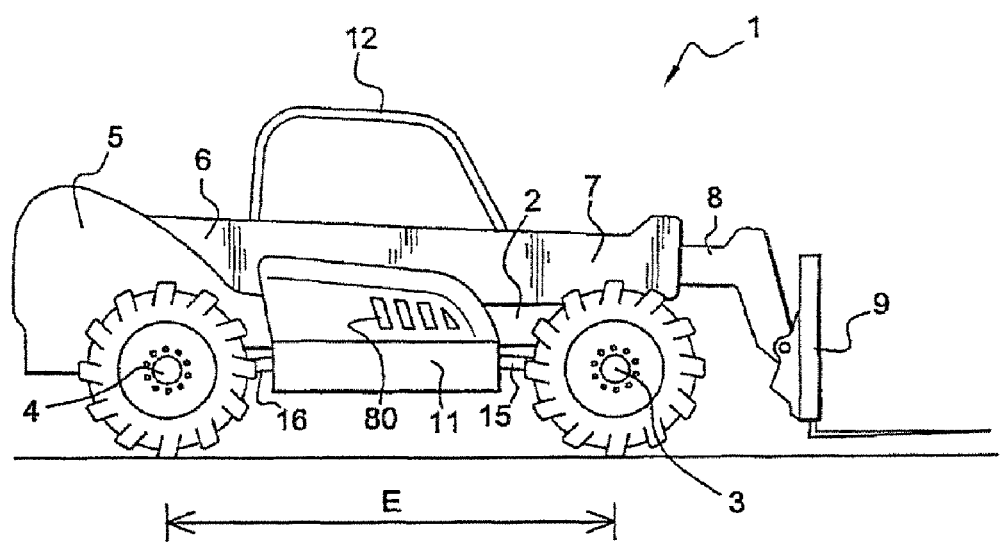
FIGS. 1 and 2 are side views, respectively from right and left, of a lift truck with telescopic fork according to the invention.
Figure 2:
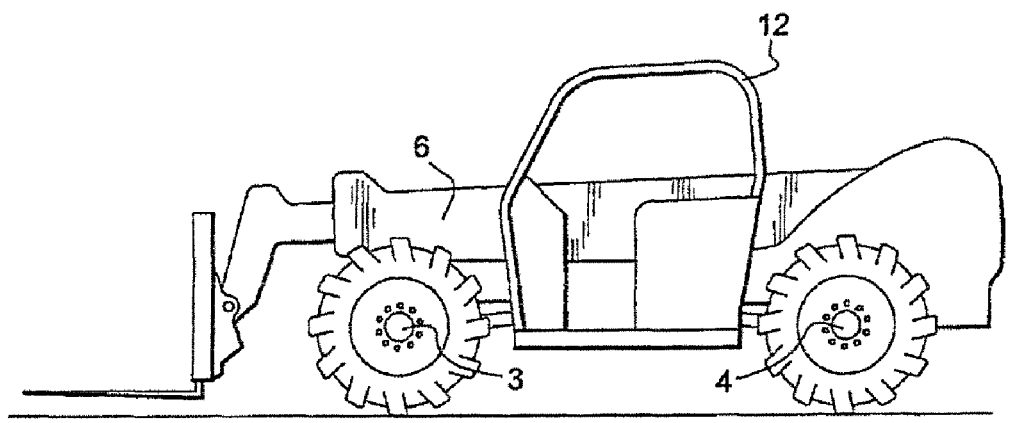

Generally, the lifter loader (1) with a telescopic jib that is illustrated in FIG. 1 comprises a chassis (2) resting on the two axles, a front axle (3) and rear axle (4). In its rear section the chassis (2) accommodates the pivot (5) of a telescopic jib (6) composed of various elements (7, 8) terminating in a tool holder (9).

The telescopic jib (6) is situated substantially in the central section of the vehicle and is flanked on one side by a cowling of the engine compartment (11) and on the other side by a driver's cab (12).

To provide the locomotion function of the vehicle, the torque delivered by the engine situated in the engine compartment (11) is transmitted to the axles (3, 4) via transmission shafts (15, 16).

Figure 3:
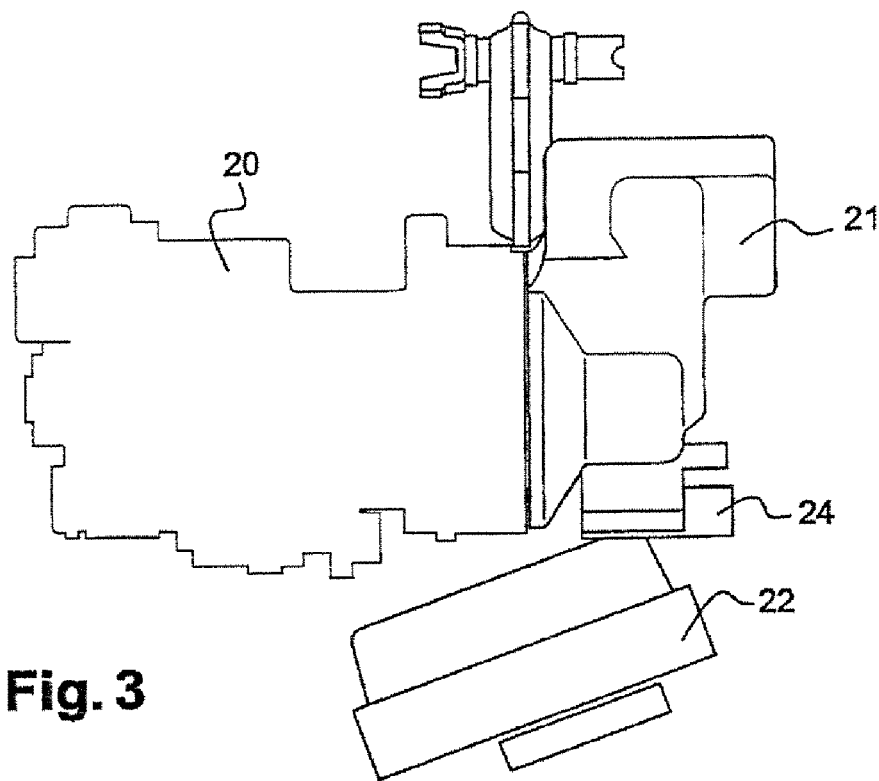
FIG. 3 is a top view of the engine/gearbox/hydraulic pump/cooling system assembly equipping the machine shown in FIG. 1.

More precisely, as illustrated in FIG. 3, the engine compartment (11) primarily comprises a combustion engine (20) combined with a gearbox (21) and also a system (22) for cooling the combustion engine (20). In this same compartment is situated the hydraulic pump (24) of the hydraulic system used to maneuver the telescopic jib (6).

As specified above, the invention consists in designing the gearbox (21) to be compact, thereby reducing the size of the engine compartment, and in optimally arranging this engine compartment so as not to impede visibility.

More precisely, and as illustrated in FIG. 5, the gearbox (21) comprises on its input side a torque converter (30) having a hollow shaft (31) and being connected to the output shaft of the engine (20).

The primary shaft, situated on the output side of the torque converter, is connected to a clutch mechanism or pack (32). This clutch pack (32) comprises an output pinion (33) which engages the main pinion (34) of a secondary shaft (35). The first pinion (37) and the second pinion (38) are mounted to freewheel on this secondary shaft (35).

The first pinion (37) engages a pinion (39) of the tertiary shaft (40). Another pinion (41) of the tertiary shaft (40) is engaged by a reversing pinion (42), itself engaged by the second pinion (38) of the secondary shaft (35).

This tertiary shaft (40) comprises a number of other pinions (46, 47) intended to engage complementary pinions (49, 50, 51, 52) of the output shaft (45).

The output shat is connected to a subassembly forming a transfer box (62) including three pinions (55, 56, 57) allowing the output side of the gearbox to be offset close to the center of the vehicle, and in order to transmit a torque to the transmission shafts (15, 16) via Cardan joints (60, 61).

More precisely, and as illustrated in FIG. 6, the first and second pinions (37, 38) can be coupled to the secondary shaft (35) by way of a synchronizing device (70) mounted with a sliding connection with respect to the shaft (35) and able to move along this shaft (35). Depending on its movement, the synchronizing device (70) can engage either the first pinion (37) or the second pinion (38) and thus transmit the rotational movement of the shaft (35) to the pinion in question.

According to the invention, the movement of this synchronizer device (70) is controlled in an electrohydraulic manner, that is to say with an electrical control acting on a hydraulic device causing the movement of the device (70). This electrical control is synchronized with the control of the clutch pack (32) so as to stop the transmission of the torque from the engine when a change of direction is desired.

The clutch and the synchronizer device (70) can be controlled to act by the same item of electrical information, generated by the movement of a switch or a specific manipulator in the driver's cab, for shifting from forward gear to reverse gear, or vice versa.

The gearbox is also equipped at its output shaft with additional synchronizer devices (72, 74) mounted with a sliding connection on the output shaft (45) and able to couple the output shaft (45) to one of the pinions (49-52) mounted to freewheel on the latter.

These two synchronizer devices (72, 74) of the output shaft can be controlled in various ways, either mechanically under the action of a gear lever accessible in the driver's cab and combined with a linkage, or else electrohydraulically or electrically.

In the same way as for the synchronizer device (70) of the secondary shaft, the control of the synchronizer devices (72, 74) of the output shaft can interrupt the transmission of the engine torque by the clutch pack (32).

Figure 4:
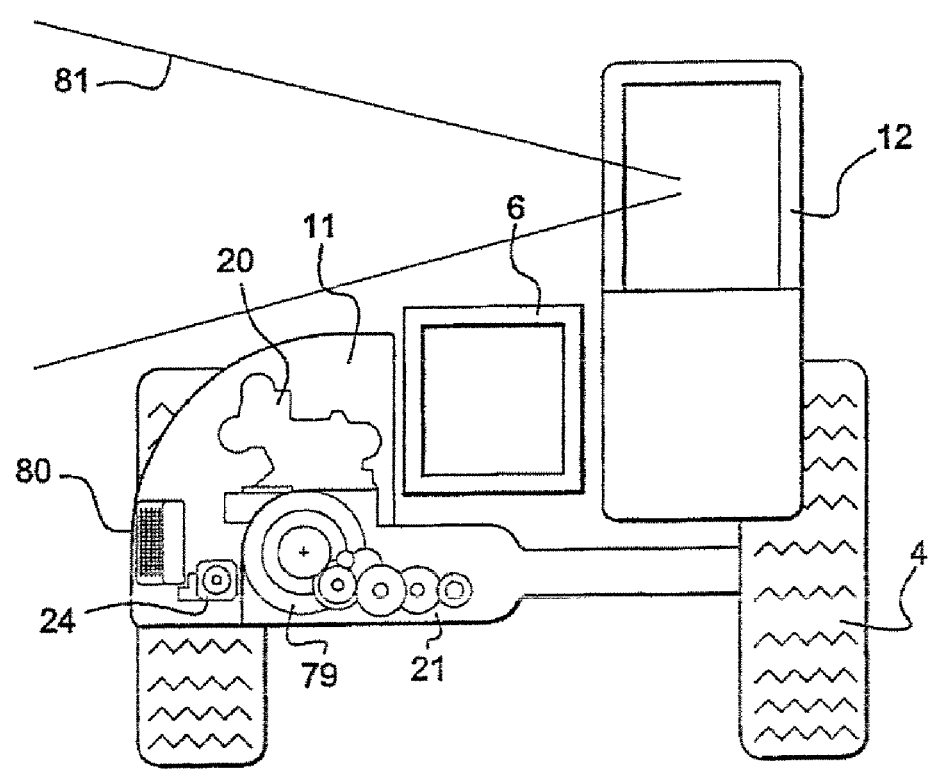
FIG. 4 is a view in cross section of the machine shown in FIG. 1, in the region of the front of the engine compartment.

According to another feature of the invention, the torque converter (30) has a hollow shaft (31) inside which is arranged a shaft (78), which is thus directly driven by the combustion engine. This drive shaft (78) is provided at its other end with a pinion (79) which can be connected, as illustrated in FIG. 4, to the hydraulic pump (24). This pump is thus arranged in the direct vicinity of the gearbox. As has already been specified, this main pump (24) distributes the fluid used to manipulate the telescopic jib (6).

As illustrated in FIG. 4, the pump (24) can be arranged on one side of the engine in a sufficiently low manner to be below the oil level in the hydraulic reservoir (not shown). In this way, the pump is operated with permanent boosting, thus increasing its reliability. This positioning is also advantageous in terms of space requirement, since, with respect to the engine, the pump is situated at the same level as the gearbox, and not in the continuation thereof, a situation which would have negative consequences on the minimum wheelbase of the machine.

Moreover, by virtue of this position, the pump can be easily accessible from outside, since it is situated directly in the vicinity of the cowling of the engine compartment (11), for maintenance operations.

It is also possible to position the pump above the level of the gearbox, using an angle transmission mechanism, in cases where the width of the engine compartment does not allow the positioning of the hydraulic pump.

As illustrated in FIGS. 3 and 4, it will be noted that the reduced space requirement of the engine/gearbox assembly allows the installation of a cooling device (22) slightly inclined laterally so as to benefit from air inlets (80) which are present at the cowling and the engine compartment (11).

Generally, and as illustrated in FIG. 4, the compactness of the gearbox according to the invention makes it possible to optimize the volume occupied by the engine compartment such that it does not project in terms of height above the jib (6). This allows the driver to maintain a field of view (81) which is not disturbed by the engine compartment (11), while at the same time benefiting from a sufficient ground clearance and a wheelbase compatible with "compact" truck uses.

The invention claimed is:

1. A gearbox for a lift truck having a telescoping jib, comprising:
   a torque converter;
   a clutch mechanism;
   a primary input shaft driven by an output of the torque converter and driving an input of the clutch mechanism;
   a secondary shaft driven by an output of the clutch mechanism, said secondary shaft having an axis of rotation that is offset from an axis of rotation of said primary input shaft;
   first and second pinions mounted to freewheel on the secondary shaft and selectively driven by a synchronizer device;
   a tertiary shaft selectively driven by said first pinion, or by said second pinion in conjunction with a reversing pinion, said tertiary shaft having an axis of rotation that is offset from the axis of rotation of said secondary shaft;
   a plurality of pinions mounted on the tertiary shaft; and
   an output shaft having an axis of rotation that is offset from the axis of rotation said tertiary shaft and selectively driven by one of the plurality of pinions mounted on the tertiary shaft.

2. The gearbox as set forth in claim 1, wherein the output shaft is connected to a transfer box adapted to be connected to a transmission shaft.

3. A lift truck having a telescoping jib and a gearbox as set forth in claim 1.

4. The gearbox as set forth in claim 1, wherein control of the synchronizer device is coordinated with control of the clutch mechanism.

5. The gearbox as set forth in claim 4, wherein control of the synchronizer device is performed electrohydraulically.

6. The gearbox as set forth in claim 1, wherein the primary input shaft is hollow, further comprising a power take-off drive shaft positioned within said hollow primary input shaft.

7. The gearbox as set forth in claim 6, wherein the power take-off drive shaft is adapted to drive a hydraulic pump that controls said telescoping jib.

\* \* \* \* \*